Patented Sept. 21, 1954

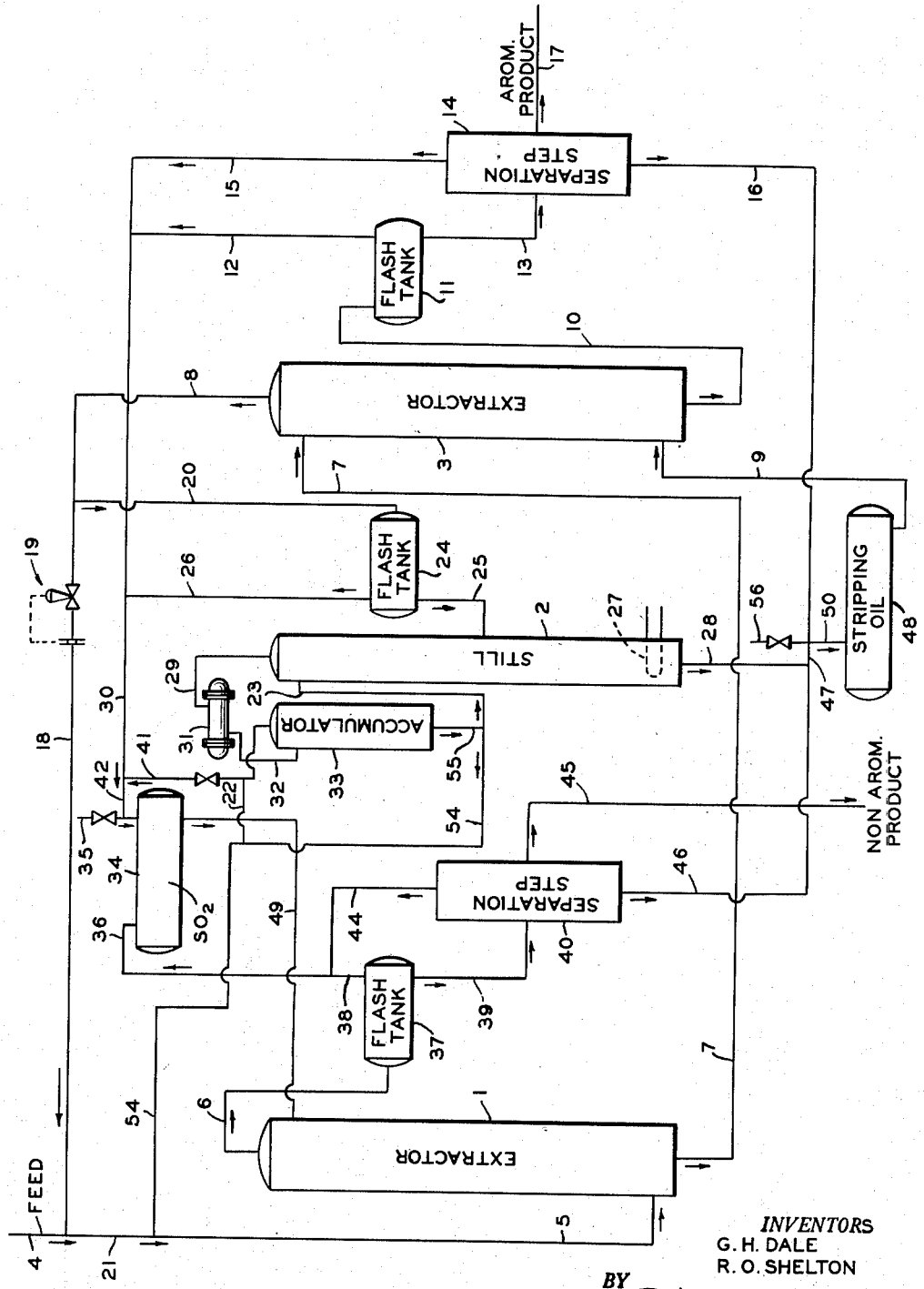

2,689,819

UNITED STATES PATENT OFFICE 2,689,819

SULFUR DIOXIDE EXTRACTION PROCESS

Russell O. Shelton and Glenn H. Dale, Bartlesville, Okla., assignors to Phillips Petroleum Company, a corporation of Delaware Application December 21, 1951, Serial No. 262,755

3 Claims. (Cl. 196—14.19)

This invention relates to solvent extraction. In one aspect it relates to a method for opertaing a sulfur dioxide solvent extraction system. In another aspect it relates to a method for the separation and recovery of aromatic hydrocarbons from hydrocarbon streams using sulfur dioxide as a solvent in which extractions may be made at temperatures above the conventional refrigeration temperatures heretofore used in systems utilizing sulfur dioxide as a solvent.

Sulfur dioxide is considered in the art an excellent solvent for extraction of aromatic hydrocarbons from mixtures of aromatic and other hydrocarbons. When solvent extracting a high aromatic content feed stock, it is necessary to carry out the extraction operations at relatively low temperatures because of the miscibility of aromatic hydrocarbons with sulfur dioxide. For example, benzene and toluene are soluble in all proportions in sulfur dioxide at atmospheric temperatures. The following tabulation illustrates the miscibility of mixtures of toluene and normal heptane with liquid sulfur dioxide. In this tabulation the toluene content is given in terms of whight per cent with the remainder of the composition being normal heptane. The temperature in degrees Fahrenheit gievn in the temperature column is the temperature above which only one phase exists for the mixture indicated.

| Weight Percent of Toluene | Temperature of Complete Miscibility, °F. |
|---|---|
| 82 | −25 |
| 63 | 6 |
| 43 | 34 |

From this tabulation it may be seen that as the toluene concentration increases it is necessary to solvent extract the toluene-heptane mixture at lower temperatures in order to obtain a phase separation and obviously it is necessary to obtain phase separation in a solvent extraction operation in order to effect a separation. It is impractical to operate immediately below the temperature of complete miscibility; hence, it is preferred to operate at some temperature well below this temperature. Thus, when operating our solvent extraction system it is preferred to operate, for example, at least 10° to 15° F. below the temperature of complete miscibility in order to obain sufficient difference in specific gravities of the two phases so that phase separation will be sufficiently rapid for commercial operation, and also so that there will be a desirable degree of selectivity for one hydrocarbon by the solvent over the other hydrocarbon or hydrocarbons. Likewise, plant temperature fluctuations should always be on the 2-phase side of the temperature of complete miscibility.

According to our invention we use a paraffinic or naphthenic stripping oil having a boiling point higher than the boiling point of any of the hydrocarbons being separated, to alter the solubility relationships between aromatic hydrocarbons and the liquid sulfur dioxide, in a novel extraction system which provides for an optimum ratio of sulfur dioxide to stripping oil in each step. Thus, when using some stripping oil in conjunction with sulfur dioxide in the first step of our novel process, we are able to operate this step at appreciably higher temperatures than could be employed in the absence of our stripping oil. Since sulfur dioxide extraction temperatures, when extracting aromatic hydrocarbons, are considerably below normal atmospheric temperatures, that is of the order of 0 to 25° F., considerable refrigeration is required. When using our stripping oil to modify the solubility relationship between the aromatic hydrocarbons and the liquid sulfur dioxide we are able to carry out this first extraction operation at temperatures considerably higher than the aforesaid 0 to 25° F., thereby saving materially on refrigertaion costs. We combine this first extraction step with a second step in which a substantially higher ratio of stripping oil to sulfur dioxide is employed, whereby we obtain an aromatic extract of greatly increased purity, as will be more fully described hereinafter.

An object of our invention is to provide a method for the separation and recovery of aromatic hydrocarbons from aromatic hydrocarbon containing feed stocks.

Another object of our invention is to provide a process for the improvement of the purity of aromatic hydrocarbon extracts, as regards the aromatic hydrocarbon content.

Still another object of our invention is to provide a process for the separation and recovery of aromatic hydrocarbons from aromatic hydrocarbon containing refinery streams.

Still another object of our invention is to provide a process for the extraction and recovery of aromatic hydrocarbons from cracked gasolines.

Yet another object of our invention is to provide such a process which is capable of yielding an aromatic hydrocarbon product of a high degree of purity and at a relatively low cost.

Still other objects and advantages of our invention will be realized upon reading the following description, which taken with the attached drawing forms a part of this specification.

As mentioned hereinbefore, our invention consists in the use of a paraffinic or naphthenic hydrocarbon type (saturated hydrocarbon) of stripping oil in conjunction with liquid sulfur dioxide as a selective solvent for the extraction and recovery of aromatic hydrocarbons. One of the points of importance of our invention is the control of the ratio of the liquid sulfur dioxide to the stripping oil in the various process stages. By means of our invention, in comparison with conventional sulfur dioxide extraction processes, we are able to operate an extraction system at a temperature requiring the use of less refrigeration and less stripping oil with about the same yield and over-all recovery of aromatic hydrocarbon or, when operating at conventional low temperatures, we obtain markedly increased yields of aromatic hydrocarbons of increased purity.

The stripping oil useful in our process may be a straight run hydrocarbon oil, as for example a low viscosity lubricating oil fraction, or it may be a kerosene or gas-oil. The oil may contain both paraffinic and naphthenic hydrocarbons or may be completely paraffinic or naphthenic in nature. Naphthenic hydrocarbons are cycloparaffinic hydrocarbons, and accordingly the generic term paraffinic hydrocarbon as applied to the stripping oil and used in this specification and claims is intended to include straight chain paraffinic, iso-paraffinic and/or naphthenic type hydrocarbon oils.

Sufficient pressure is maintained in the extractors and settler to make certain that liquid phase conditions exist therein.

The lower temperature limits at which our system may be operated are defined at least in part by the solidification or freezing point of hydrocarbon constituents in the stripping oil. The stripping oil also should possess an initial boiling point somewhat higher than the end boiling point of any of the hydrocarbons being treated, since if there is an overlapping of boiling points, feed stock hydrocarbons may accumulate in the stripping oil or stripping oil hydrocarbons may be removed from the system in one of the hydrocarbon products. The distillation end point of the stripping oil is not particularly critical, but when this temperature is too high, freezing points of high boiling constituents may disadvantageously limit desirably low operating temperatures. The paraffinic oil used in the example given hereinbelow is a vacuum distillate oil having a viscosity somewhat less than that of an SAE 10 motor oil. The oil has an initial boiling point of about 600° F. We find that an oil of this type is very satisfactory as a stripping oil in carrying out the objects of our invention. Upper temperatures useful in the practice of our invention may be in the vicinity of 90 to 100° F. although still higher temperatures could be used provided the system pressures were increased sufficiently to maintain liquid phase conditions in the extraction vessels and connecting pipes and the like. However, when operating at high temperatures proportionately more stripping oil has to be used because of the increased miscibility of the feed stock hydrocarbons in liquid sulfur dioxide. In general, it is preferable to operate our system within a temperature range of about 0° to 70° F. Within this temperature range, excessive proportions of stripping oil are not needed. While, as mentioned hereinbefore, lower temperatures used are limited by the freezing point of the stripping oil and higher temperatures may be used as limited by the miscibility relations and operating pressure. By the term "freezing point of the stripping oil" we mean the temperature at which the first hydrocarbon crystallizes upon gradual cooling of the stripping oil.

In the drawing the figure is an elevational view, in diagrammatic form, of one embodiment of apparatus useful in carrying out the process of our invention. Referring now to the drawing, apparatus parts 1 and 3 are countercurrent solvent extractors. These vessels are extraction columns and may be of conventional design or of such design desired for liquid-liquid countercurrent contacting and may be filled with conventional packing apparatus such as caps and trays or the like. Element 2 is a still equipped with a reboiler coil 27 and reflux apparatus, the operation of which will be described hereinbelow. Elements 14 and 40 are identified on the drawing as "separation steps." These separation steps may be one or more distillation vessels or such other equipment as is suitable for separating sulfur dioxide, gasoline boiling range hydrocarbons and a high boiling oil as separate products.

A cracked gasoline feed stock with recycle materials to be described hereinbelow is introduced into extractor 1 through a feed line 5. The extractor 1 is previously filled with liquid sulfur dioxide from a line 49. Sufficient pressure is maintained in the extractors to make certain that liquid phase conditions are maintained therein. Since the liquid sulfur dioxide is heavier than the hydrocarbon feed stock the sulfur dioxide tends to flow downward and in countercurrent relation to the upward flowing feed stock. A raffinate phase is removed from the top of extractor 1 through a raffinate line 6 and this material is passed on to a flash tank 37 in which sulfur dioxide is given an opportunity to flash from the less volatile constituents of the raffinate phase. This sulfur dioxide is withdrawn from the flash tank 37 through a line 38 and is passed on through a line 36 into a sulfur dioxide storage or run tank 34. The unvaporized constituents of the raffinate phase accumulate in the bottom of the flash tank 37 as a liquid phase and this material is removed through a line 39 and is introduced into the separation step 40. This separation step 40, may include one or more stills or other separation equipment suitable for separating sulfur dioxide, feed stock constituents and high boiling stripping oil constituents. The sulfur dioxide is removed from this separation step through a line 44 and is passed on through line 36 into the sulfur dioxide run tank 34. The stripping oil constituents are removed through a line 46 and are passed on through lines 47 and 50 into a stripping oil storage or surge tank 48. Product hydrocarbons are removed through a line 45 for such disposal as desired. According to our process this hydrocarbon product removed through line 45 is the non-aromatic portion of the feed stock.

The extract phase is withdrawn from the bottom of the extractor 1 through a line 7 and is introduced into the secondary extractor 3. Into the bottom of this extractor is introduced stripping oil from a line 9. This stripping oil flows upward and in countercurrent relation to the down flowing extract phase charge from extractor 1. In this column 3 stripping oil amounts substantially to a secondary solvent and in its upward course through the extractor it strips or extracts from the down flowing mixture of sulfur dioxide and aromatic constituents of the original charge stocks the less aromatic components. In this column sufficient stripping oil is introduced to strip not only the non-aromatic constituents but to strip some of the aromatic components so as to produce from this column a final product rich in aromatic hydrocarbons. Such a product is removed from the bottom of the extractor through a line 10.

The stripping oil phase, which in this case is termed a secondary extract phase and contains non-aromatic and some aromatic hydrocarbons, is removed through the overhead line 8. This secondary extract phase from line 8 is divided into two portions, one portion is passed through a line 18, while the other portion is passed through a line 20. The portion passing through line 18 is controlled by a flow controller assembly 19. The extract phase passing through line 18 is passed on through a line 21 and feed line 5 for introduction into the bottom of the primary extractor. Raw feed stock to be processed according to our system is introduced through a line 4 from a source not shown. This raw feed stock from line 4 is admixed with the portion of the secondary extract phase flowing through line 18 and is further mixed with the cycle material from line 54 which will be described hereinbelow. Thus the actual feed stock entering column 1 from line 5 is a mixture of the above mentioned three constituents.

The portion of the secondary raffinate phase from line 8 passed through the line 20 into a flash tank 24 is given an opportunity to flash sulfur dioxide prior to introduction of the material into the still 2. The flashed sulfur dioxide is removed from tank 24 through a line 26 and is passed on through a line 30 into the sulfur dioxide run tank 34. The extract phase free from excess sulfur dioxide is removed from the flash tank 24 through a line 25 and is introduced into about a mid-section of the still 2. This still is intended to be operated under such temperature and pressure conditions as to separate the stripping oil portion of this portion of the secondary extract phase. Sulfur dioxide and gasoline hydrocarbons are removed from this still through an overhead line 29. This overhead product is condensed in a condenser 31 and condensate flows through a line 32 into an accumulator tank 33. The liquid from accumulator tank 33 is passed through a line 55 and a portion thereof on through a reflux line 23 and introduced into the top of still 2 for refluxing purposes. Reflux may be necessary in this case to assist in effecting a clean separation between the higher boiling components of the gasoline feed stock and the lower boiling components of the stripping oil. The remainder of the liquid from line 55 is passed on through the line 54 for mixing with the raw gasoline feed stock and the portion of the secondary extract phase from line 18. Stripping oil is removed from still 2 through line 28.

In this manner we are able to remove any desired portion of the stripping oil from the secondary extract phase prior to introduction of the remainder of the secondary extract phase components for retreatment in the primary extractor 1. Thus by removing, for example one-half of the stripping oil from the secondary extract phase in still 2 we are able to control the stripping oil content of the feed entering extractor 1 through the line 5 so as to maintain a sulfur dioxide to stripping oil ratio in column 1 of, for example 2:1 with a sulfur dioxide to stripping oil ratio in extractor 3 of 1:1. By variation in the adjustment of the rate of flow controller assembly 19 we can by-pass from the stripping oil separation still 2 any proportion of the secondary extract phase desired. Thus by maintaining other conditions constant, when the proportion of secondary extract flowing through line 18 is increased the proportion of stripping oil introduced into extractor 1 is is increased, while restricting the flow of extract phase through line 18 decreases the stripping oil content in the extractor 1.

The accumulator tank 33 is provided with a pipe 22 which is for removal of flashed sulfur dioxide and for its introduction into material flowing through line 54. If however, it is desired, this flashed sulfur dioxide instead of being reintroduced into the liquid phase from accumulator 33 may be passed through a line 41 to join the sulfur dioxide already flowing through line 30. However, this quantity of sulfur dioxide from accumulator tank 33 is ordinarily relatively small and it may be conventionally reintroduced into the overhead condensate and passed on into the primary extractor 1.

The stripping oil bottoms from the still 2 is withdrawn through a line 28 and is passed on through the line 47 with the stripping oil from line 46 for introduction into the run tank 48.

The material removed from the bottom of the secondary extractor 3 through the line 10 is introduced into a flash tank 11 for separation of large quantities of sulfur dioxide. The flashed sulfur dioxide is removed from tank 11 through a line 12 and is added to that entering line 30 from line 26. The flash tank bottoms is passed on through a line 13 and is introduced into the separation step 14. This step, as mentioned hereinbefore, may be any desired type of separation step suitable for separating dissolved sulfur dioxide, gasoline product materials and stripping oil. This step advantageously may be one or two distillation columns. The separated sulfur dioxide from this step is withdrawn through a line 15 and is added to that flowing through the line 12. The stripping oil separated is passed through a line 16 and line 50 into the stripping oil run tank 48. The product hydrocarbon is removed through a line 17 and is passed to such disposal as desired.

Make up sulfur dioxide is introduced into the system through a line 35 as needed, while make up stripping oil from a source, not shown, is intoduced into the system through a line 56 as needed.

According to the above described operational steps based on a cracked gasoline feed stock there is separated the non-aromatic constituents which are removed from the separation step 40 through the line 45. Based on one part by weight of gasoline charge stock from line 4 there is separated through line 45 0.5 part by weight non-aromatic gasoline. The hydrocarbon product removed from the separation zone 14 through line 17 constitutes the aromatic portion of the charge and in this particular case it constitutes 0.5 part by weight hydrocarbons of 98 per cent purity based on one part by weight of cracked gasoline charge to the process.

In the following specific example are given the compositions of streams at various stages of the process illustrated in the drawing. In this example are given the composition of the feed stock and the compositions at least in part of the various stages.

*Specific example*

Feed stock: Cracked gasoline containing 54 per cent aromatic, 23 per cent paraffinic, 11 per cent naphthenic and 12 per cent olefinic hydrocarbons by volume, and boiling from 298° to 457° F.

Temperature, in extraction vessels 1 and 3, 20° F.

Stripping oil, straight run lube oil distillate fraction, 600° F. I. B. P., vis. equivalent to about SAE 10.

The following stream compositions are given in parts by weight per part by weight of feed stock.

| Stream No. | Gasoline Components | SO₂ | Stripping Oil |
|---|---|---|---|
| 5 | 5 | | 5 |
| 49 | | 10 | |
| 6 | 0.5 (non-arom.) | | 5 |
| 7 | 4.5 | 9.9 | |
| 4 | 1 (Raw feed) | | |
| 45 | 0.5 (non-arom.) | | |
| 46 | | | 5 |
| 18 | 2 | | 5 |
| 54 | 2 | | |
| 9 | | | 10 |
| 10 | 0.5 (arom.) | 9.8 | |
| 8 | 4 | | |
| 15 | | 9.8 | |
| 17 | 0.5 (arom. 98%) | | |
| 20 | 2 | | 5 |
| 25 | 2 | | 5 |
| 28 | | | 5 |

In Extractor 1, sulfur dioxide to stripping oil ratio, 2:1.
In Extractor 3, sulfur dioxide to stripping oil ratio, 1:1.

From the above given example it may be noted that the product withdrawn through line 17 contains 98 per cent aromatics. The aromatic content of this high aromatic product may be varied in either direction from 98 per cent by varying the proportion of secondary raffinate phase distilled in still 2 for separation of stripping oil. According to this example one-half of the secondary extract phase is passed into still 2 so that one-half of the stripping oil of the secondary extract phase will be removed and all or substantially all of the other constituents of the secondary extract phase will be introduced as a portion of a charge stock to the primary extractor. If it is desired to increase the aromatic content of the aromatic product from line 17, it may be done by increasing the stripping oil to the secondary extractor. If it is desired to increase the yield of aromatic hydrocarbons it may be done by decreasing the stripping oil to the primary extractor.

The purity of the aromatic fraction as well as the yield of aromatics may also be modified by variation of the temperature maintained in extractors 1 and 3. By increasing the temperatures in these extractors the selectivity of the sulfur dioxide is decreased and the aromatic content of the aromatic product will be decreased. When extraction temperature is so altered it is necessary then to alter the sulfur dioxide to stripping oil ratios in these extractors to obtain full or substantially full recovery of the aromatic content of the feed stock.

When treating a cracked gasoline as is given in the above example some olefin hydrocarbons will ordinarily be recovered with the aromatic product. Paraffinic and naphthenic hydrocarbons go almost completely with the non-aromatic product while as mentioned the olefins will usually be distributed between the aromatic and the non-aromatic products. This distribution of olefins, at least in part may be explained by stating that the higher molecular weight olefins tend to be included in the non-aromatic product, while the lower molecular weight olefins tend to be included with the highly aromatic product.

Such auxiliary apparatus as pumps, valves, pressure and temperature indicators, recorders and controllers are not shown in the drawing nor described in the specification for simplicity and brevity purposes. The need, installation and operation for such auxiliary apparauts is well understood by those skilled in the art. For example line 36 and line 42 should be provided with condensers for condensing the sulfur dioxide prior to its introduction into the surge tank 34. A cooler is needed in line 50 to cool the stripping oil prior to its introduction into its run tank 48.

While certain embodiments of our invention have been described for illustrative purposes, the invention obviously is not limited thereto.

We claim:

1. A method for the separation and recovery of aromatic hydrocarbons from a cracked gasoline feed stock containing aromatic and non-aromatic hydrocarbons comprising solvent extracting in a first extraction operation said feed stock with liquefied sulfur dioxide in the presence of a first portion of a paraffinic hydrocarbon material boiling at a temperature above the end boiling point of said feed stock and as subsequently produced, the ratio of said sulfur dioxide to said first portion of paraffinic hydrocarbon material being maintained in a ratio of about 2 to 1, from this first extraction operation separating a first extract phase and a first raffinate phase, solvent extracting in a second extraction operation said first extract phase with a second paraffinic hydrocarbon material boiling at a temperature above the end boiling point of said feed stock and as subsequently produced, the ratio of the sulfur dioxide to the second paraffinic hydrocarbon material in said second extraction operation being about 1 to 1, from this second extraction operation separating a second raffinate phase comprising aromatic hydrocarbons and a second extract phase comprising said second paraffinic hydrocarbon material boiling at a temperature above the end boiling point of said feed stock, aromatic and non-aromatic hydrocarbons, dividing said second extract phase into two portions, introducing one portion into said first extraction operation as said first portion of a paraffinic hydrocarbon material as subsequently produced, distilling the other portion of said second extract phase to produce a bottoms product comprising said second paraffinic hydrocarbon material and an overhead product comprising sulfur dioxide, aromatic and non-aromatic hydrocarbons, passing said bottoms product to the second extracting operation as said second paraffinic hydrocarbon material subsequently produced and introducing the latter overhead product into the first extraction operation.

2. The process of claim 1 wherein the two extraction operations are carried out at a temperature of 20° F.

3. The process of claim 1 wherein the two extraction operations are carried out at a temperature between about 0° and 100° F.

References Cited in the file of this patent

UNITED STATES PATENTS

| Number | Name | Date |
|---|---|---|
| 2,100,429 | Bray | Nov. 30, 1937 |
| 2,114,524 | Egli | Apr. 19, 1938 |
| 2,412,828 | Naragon | Dec. 17, 1946 |

FOREIGN PATENTS

| Number | Country | Date |
|---|---|---|
| 441,104 | Great Britain | Jan. 13, 1946 |